United States Patent Office 2,999,089
Patented Sept. 5, 1961

2,999,089
POLYMERIZATION OF CONJUGATED DIENES WITH POLYNUCLEAR HYDROCARBONS AS POLYMERIZATION PROMOTERS
James N. Short and Ralph C. Farrar, Bartlesville, Okla., assignors to Phillips Petroleum Company, a corporation of Delaware
No Drawing. Filed Jan. 27, 1958, Ser. No. 711,141
17 Claims. (Cl. 260—94.3)

This invention relates to the promotion of polymerization reactions. In another aspect this invention relates to a liquid phase catalytic polymerization of monomer systems comprising conjugated dienes in the presence of a polynuclear aromatic hydrocarbon as a promoter.

Conjugated dienes with or without copolymerizable monomers can be polymerized to produce rubbery, resinous or plastic-like products by contacting the monomeric materials with a catalyst system comprising (a) a hydride or organo compound of one of the metals aluminum, gallium, indium, thallium and beryllium, and (b) a di-, tri- or tetrahalide of a group IV metal including titanium, silicon, thorium, zirconium, tin, lead, hafnium, germanium and cerium. In many of these polymerization reactions it is advantageous to employ low temperatures to increase the molecular weight of the polymer formed. When polymerizing butadiene in the presence of a catalyst system such as trialkylaluminum and titanium tetraiodide, a higher percentage of the cis polymer is obtained when the temperature of the polymerization is lowered. When operating at low temperatures, however, reaction rates and conversions are generally reduced appreciably.

We have discovered that polymerization reactions as above described can be successfully promoted to give increased conversion rates and enable higher conversion levels by employing, in addition to the catalyst system and liquid diluent, a small amount of polynuclear aromatic hydrocarbon containing at least two fused aromatic rings. When practicing our invention, it is not essential that all of the promoter be in solution in the diluent and it is frequently desirable that at least a portion of the promoter be present in the undissolved state. The increase in rate of polymerization and in conversion which can be attributed to the use of our promoters is most pronounced when the temperature of the polymerization is quite low, that is, below about 5° C.

It is an object of our invention to provide a method of promoting the polymerization of monomer systems comprising conjugated dienes.

It is another object to provide an improved method of catalytically polymerizing conjugated dienes in the liquid phase.

Still another object of our invention is to provide a method of improving the polymerization rates and conversion levels obtainable at low temperatures for such polymerization.

Still another object is to provide an improved method of polymerizing butadiene to form a rubbery polymer which contains a high percentage of cis 1,4 configuration.

Other objects, advantages and features of our invention will be apparent to those skilled in the art from the following discussion and claims.

The polymers and copolymers which are produced by the process of our invention have utility in applications where rubber and solid plastics are used. The physical properties of the product will depend, in general, upon the monomers used and the conditions under which the polymerization is carried out. The products can be used in the manufacture of automobile tires and other rubber articles and they can be molded to form articles of any desired shape, such as bottles and other containers for liquids. The cis 1,4-polybutadiene which can be produced with improved yields at low temperature is especially suitable for use in truck tires because of the relatively low hysteresis of this rubber, resembling natural rubber in this respect.

The catalysts which are employed in our process comprise, as above described, a metal hydride or organometal and a halide of a group IV metal. The hydride or organo compounds used in these catalyst systems can be represented by the general formula $X_mMR_n$ wherein M is one of the metals aluminum, gallium, indium, thallium or beryllium; each R is either hydrogen, a monovalent saturated acyclic hydrocarbon radical, a monovalent saturated cyclic hydrocarbon radical, a monovalent aromatic hydrocarbon radical or any combination thereof; X is an alkali metal, that is, sodium, lithium, potassium, rubidium or cesium; $m$ is either 0 or 1 indicating either the presence or absence of the alkali metal; and $n$ is an integer which is equal to the sum of $m$ plus the valence of M. Examples of these catalysts which are represented by the formula when $m$ equals 0 and $n$ is thus equal to the valence of the metal M are $Al(C_2H_5)_3$, $Al(CH_3)_3$, $HAl(C_2H_5)_2$, $H_2AlCH_3$, $Be(CH_3)_2$, $AlH_3$, $Ga(C_3H_7)_3$, $In(CH_3)_3$, $Be(C_6H_5)_2$, $Al(C_6H_{13})_3$ $Al(CH_2-(CH_2)_{18}-CH_3)_3$, $Ga(C_6H_5)_3$, $In(C_6H_5)_3$ $H_2Al(C_6H_{11})$, $Tl(CH_3)_3$, and the like. Examples of these catalysts when $m$ equals 1 are $LiAlH_4$, $NaAl(CH_3)_4$, $NaBe(C_6H_5)_3$, $NaBe(C_2H_5)_3$ and the like. These polymerization catalysts can also be used in the form of their known and stable organic complexes, such as complexes with ethers, thioethers or amines.

In admixture with one or more of the hydride or organo compounds described above, the catalyst comprises at least one group IV metal (Mendelyeev's Periodic System) di-, tri- or tetrahlide. The di-, tri- or tetrahalides of any or all of the group IV metals can be used, including titanium, silicon, thorium, zirconium, tin, lead, hafnium, germium and cerium. Di-, tri- and tetrachlorides, di-, tri- and tetrabromides, di-, tri- and tetraiodides and di-, tri- and tetrafluorides of the group IV metals can be used in the catalyst composition either individually or as mixtures. The term "group IV metal" as used herein is defined as meaning any or all of the foregoing metals, and silicon is defined as a group IV metal for these purposes. The tetrahalides of titanium and zirconium are the preferred compounds, with the tetrachlorides and tetraiodides of these metals being especially useful because they have a high activity in the process of this invention.

Among catalyst compositions which are preferred are the following: a mixture of titanium tetraiodide and triethylaluminum; a mixture of titanium tetraiodide and tripropylaluminum; a mixture of titanium tetraiodide and tributylaluminum; a mixture of titanium tetrachloride and triethylaluminum; and a mixture of zirconium tetrachloride and triethylaluminum.

The amount of the $X_mMR_n$ compound used in these catalyst compositions is usually in the range of 0.05 to 50 mols per mol of the group IV metal compound. A preferred ratio, however, is from 0.3 to 20 mols of the $X_mMR_n$ compound per mol of the group IV metal di-, trior tetrahalide. Increased yields of the rubbery polymer are obtained when using a catalyst composition falling within the preferred ratio.

The monomeric material polymerized to produce rubbery polymers by this process comprises conjugated dienes containing from 4 to 8, inclusive, carbon atoms. Examples of conjugated dienes which can be used include 1,3-butadiene, 2-methyl-1,3-butadiene (isoprene), 2,3-dimethyl-1,3-butadiene, 2 - methyl - 1,3 - pentadiene, chloroprene, 1-cyanobutadiene, 2,3-dimethyl-1,3-pentadiene, 2-methyl-3-ethyl-1,3-pentadiene, 2-methoxybutadiene, and the like. In a preferred process, isoprene is polymerized in the presence of the catalyst above described to form cis 1,4-polyisoprene having a chemical structure substantially the same as that of natural rubber. In another preferred process, 1,3-butadiene is polymerized in the presence of one of the catalyst systems herein described to form polybutadiene in which an excess of 90 percent of the polymer is formed by 1,4-addition of butadiene.

This invention is applicable to the polymerization of the above-defined conjugated dienes either alone or in admixture with each other and/or with one or more other compounds containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene and 1-octene. Branched chain olefins, such as isobutylene, can be used as well as 1,1-dialkyl-substituted and 1,2-dialkyl-substituted ethylenes such as 2-methylbutene-1, 2-methylhexene-1, 2-ethylheptene-1, and the like. Other olefins which can be used include di- and polyolefins, such as 1,5-hexadiene, 1,4-pentadiene and 1,4,7-octatriene, and cyclic olefins, such as cyclohexene. Other examples of compounds containing an active $CH_2=C<$ group which are copolymerizable with one or more of the conjugated dienes are styrene, acrylonitrile, methacrylonitrile, methyl methacrylate, vinyl chloride, 2-methyl-5-vinylpyridine, 2-vinylpyridine, 4-vinylpyridine, and the like.

The process of our invention is of greatest advantage in the polymerization of the above-described monomers to produce rubbery polymers. The term "rubbery polymer" includes elastomeric, vulcanizable polymeric material which after vulcanization, i.e., crosslinking, possesses the properties normally associated with vulcanized rubber, including materials which when compounded and cured exhibit reversible extensibility at 80° F. of over 100 percent of a specimen's original length with a retraction of at least 90 percent within one minute after release of the stress necessary to elongate to 100 percent.

The polymer which is most highly preferred for the practice of my invention is cis 1,4-polybutadiene. This polymer is prepared by polymerizing 1,3-butadiene substantially as described above in the presence of a catalyst system comprising triakylaluminum and titanium tetraiodide. Polybutadiene thus produced is a rubbery polymer containing as high as 90 percent and higher cis 1,4 addition. Preparation of this polymer is described more fully in the copending application of David R. Smith et al., Serial No. 578,166, filed April 16, 1956.

The trialkylaluminum employed in this preferred catalyst system with titanium tetraiodide can be represented by the formula $R_3Al$, wherein R is an alkyl radical containing 1 to 6 carbon atoms. The alkyl groups can be either straight or branched chain alkyls and they can be the same or different. For example, suitable alkyls are ethyl, propyl, isopropyl, n-butyl, isobutyl, pentyl, n-hexyl or isohexyl and the like. Mixed alkyl groups, such as indiisobutylmonoethylaluminum, are also suitable. Triethylaluminum and triisobutylaluminum are preferred since these compounds have a high activity in the polymerization process. Carbon dioxide, oxygen, and water are known to be destructive to these catalyst compositions and should be avoided in the reaction mixture although anhydrous conditions are not essential.

The amount of trialkyl aluminum used in this preferred catalyst composition is usually in the range of 1.25 to 50 mols per mol of titanium tetraiodide. When triisobutylaluminum is the alkyl aluminum employed, the preferred ratio is from about 1.7 to 35 mols of triisobutylaluminum per mol of titanium tetraiodide. When triethylaluminum is employed, the preferred ratio, on the same basis, is 1.5 to 10. Increased yields of polybutadiene are obtained when using catalyst compositions falling within these preferred ratios.

The temperature at which the polymerization process is carried out should not exceed 150° C. in order to maintain the degree of gel formation as low as possible. The temperature is generally within the range of −100° C. to 100° C. but it is preferred to operate in the range of about −50° C. to 50° C. As discussed above, one of the principal advantages of our invention is the ability to operate at low temperatures, for example, less than 5° C., with satisfactory yields and thereby obtain higher molecular weight polymers and, in the preparation of polybutadiene with the above-mentioned preferred catalyst system, a higher percentage of cis 1,4-configuration. The pressure of the reaction is sufficient to maintain the diluent employed substantially in the liquid phase. Although pressures ranging from atmospheric up to 30,000 pounds per square inch gauge or higher can be employed, depending upon the diluent and monomer system, a pressure in the range of from atmospheric to 1,000 pounds per square inch gauge is usually preferred.

The amount of catalyst composition in the reaction mixture can vary over a wide range, but is usually in the range of about 0.01 to 15 weight percent, or higher, based on the amount of monomeric material charged to the reactor. The preferred catalyst concentration in the production of cis 1,4-polybutadiene is in the range of 0.05 to 10 weight percent and more preferably between 0.05 and 5 weight percent based on the 1,3-butadiene charged to the reactor. In general, at the lower mol ratios of trialkylaluminum to titanium tetraiodide, it is frequently desirable to operate above the minimum level of catalyst concentration.

Suitable diluents for use in the polymerization process are paraffins, cycloparaffins and/or benzenoid hydrocarbons which are relatively inert, non-deleterious and liquid under the reaction conditions of the process. The lower molecular weight paraffins, such as propane, n-butane, isobutane, n-pentane, and isopentane, are especially useful when the process is carried out at low temperatures. The higher molecular weight paraffins and cycloparaffins, preferably containing not more than 10 carbon atoms per molecule, such as n-hexane, isohexane, isooctane, n-decane, cyclohexane, and methylcyclohexane and benzenoid hydrocarbon diluents such as benzene, toluene, xylene, ethylbenzene, and the like, as well as mixtures of these diluents can also be used. Sufficient diluent should be used to provide a liquid reaction phase for the polymerization and it is seldom necessary to use over 1500 parts by weight of diluent per 100 parts of monomer in the reactor. It is not necessary that the polynuclear aromatic hydrocarbon promoter be entirely dissolved in the diluent selected.

The promoters which increase the conversion of the desired polymers in the process of our invention are polynuclear aromatic hydrocarbons which contain at least two fused aromatic rings and do not exceed 26 carbons atoms in the molecule. Examples of such compounds include acenaphthene, perinaphthane, 2,3-benzofluorene, retene, pentacene, chrysene, 1,2-benzathracene, pyrene, perylene, fluoranthene, 1,2,5,6-dibenzanthracene, 3,4-benzpyrene, methylcholanthene, cholanthene, 5,10-dimethyl-1,2-benanthracene, 10-methyl-1,2-benzanthracene, 9,10-dimethyl - 1,2 - benzanthracene, triphenylene, benzophenanthrene, naphthacene and the like.

Because many of the above-mentioned compounds may be of a carcinogenic nature, it is preferred to employ compounds which can be represented by one of the following general formulas, the total number of carbon atoms in the molecule, as mentioned previously, not to exceed 26:

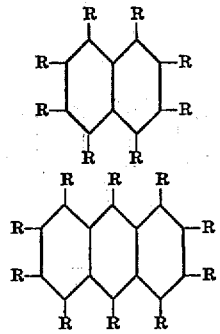

or

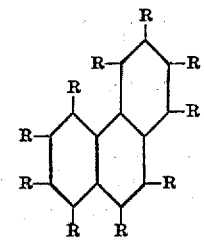

where each R is selected from the group consisting of hydrogen, alkyl, aryl, alkaryl, aralkyl and cycloalkyl.

Examples of this preferred group of compounds are 1 - methylnaphthalene, 2 - methylnaphthalene, 1,2 - dimethylnaphthalene, 1 - ethylnaphthalene, 1 - methyl-2-ethylnaphthalene, 1-n-propylnaphthalene, 2-hexylnaphthalene, 2,7 - di - n - butylnaphthalene, 1,8 - diphenylnaphthalene, 1,2,7,8 - tetramethylnaphthalene, 9,10 - dimethylanthracene, 1,8-diethylanthracene, 1,2-diisopropylanthracene, 1 - phenylanthracene, 1,2 - dimethylphenanthrene, 1 - phenylphenanthrene, 2,7 - diethylphenanthrene, 1 - methyl - 2 - ethylphenanthrene, 9,10-diethylphenanthrene, 1,2,7,8 - tetramethylphenanthrene, 2-dodecylanthracene, 1 - n - hexadecylnaphthalene, 1,8-diphenylanthracene, 1 - (4 - ethylphenyl)phenanthrene, 1-cyclohexylnaphthalene, 2 - (2 - cyclopentylbutyl)naphthalene, 2-(3 - phenylpropyl) - 6 - isopropylphenanthrene, 1,4,6-triethylnaphthalene, and the like.

The promoters which are most highly preferred for our invention because of their high activity, ease of use, and availability are the polynuclear aromatic hydrocarbons which contain from 2 to 3, inclusive, fused unsubstituted aromatic rings. Specifically, these compounds are naphthalene, anthracene and phenanthrene. The optimum amount of promoter can readily be selected for the particular catalyst and monomer system but, in general, will be in the range between 0.05 and about 10 weight percent, based on the amount of diluent.

The process of this invention can be carried out as a batch process by charging the monomeric material comprising conjugated dienes into a reactor containing catalyst and diluent, or the process can be carried out continuously by maintaining the above-mentioned concentrations of reactants in the reactor for a suitable residence time. The residence time in a continuous process will, of course, vary within rather wide limits depending upon such variables as temperature, pressure, the catalyst system being employed, and the material which is being polymerized. In a continuous process, the residence time will generally fall within the range of one second to one hour when conditions within the specified ranges are employed. When a batch process is being employed, the time for the reaction can be as high as 24 hours or more. While the reaction times given necessarily cover a rather broad range, it should be understood that for any desired conversion level the reaction period can be considerably shortened by using the promoters described according to our invention. This is especially pronounced when the reaction temperatures are quite low and the solubility of the promoter is low.

At the completion of the polymerization reaction, the reactor effluent is treated to inactivate the catalyst, as by washing with an alcohol. This washing step is carried out with agitation and the polymer is separated from the alcohol and diluent and dried.

Advantages of this invention are illustrated by the following example. The reactants, and their proportions, and other specific conditions are presented as being typical and should not be construed to limit the invention unduly.

EXAMPLE

A series of runs was made in which 1,3-butadiene was polymerized to a rubbery polymer in the presence of a triisobutylaluminum-titanium tetraiodide catalyst system using toluene as the solvent. A polynuclear aromatic hydrocarbon (anthracene, naphthalene, or phenanthrene) was employed as a promoter for the polymerization.

The catalyst was preformed at the temperature used in the polymerization. The titanium tetraiodide (0.6302 gram) was weighed into 50 milliliters of toluene which had been purged with prepurified nitrogen, the mixture was placed in a 50° C. bath and agitated for several minutes, and it was then cooled to −18.5° C. after which 10.57 milliliters of a 0.537 M solution of triisobutylaluminum in toluene was added.

Toluene was charged to each of several 7-ounce beverage bottles, the promoter was introduced, and the bottles were purged with prepurified nitrogen and heated to 50° C. to dissolve as much of the promoter as possible. The bottles were then cooled to −18.5° C. and sealed with a neoprene seal and a crown bottle cap which was punched so as to expose a portion of the neoprene seal. Butadiene was introduced with a syringe followed by the previously prepared catalyst which was added in the same manner. The bottles were agitated in the −18.5° C. bath throughout the polymerization period. While still at this temperature, 50 milliliters of a mixture prepared from 2.5 liters of toluene, 50 grams of phenylbeta-naphthylamine, and 100 milliliters of isopropyl alcohol was added to inactivate the catalyst and protect the product from oxidation. In each case the reaction mixture was poured slowly, with stirring, into about 800 milliliters of isopropyl alcohol to precipitate the polymer. The mixture was poured through a screen to separate the polymer which was placed in an air oven at about 65° C. for an hour to drive off excess alcohol and toluene and then dried in a vacuum oven at 60° C. for 24 hours.

Polymerization recipes employed were as follows:

Table I

| | Parts by Weight | | |
|---|---|---|---|
| | A | B | C |
| Butadiene | 100 | 100 | 100 |
| Toluene | 433 | 433 | 433 |
| Anthracene | variable | | |
| Naphthalene | | variable | |
| Phenanthrene | | | variable |
| Triisobutylaluminum (TBA) | [1] 0.992 | [1] 0.992 | [1] 0.992 |
| Titanium tetraiodide (TTI) | [2] 0.555 | [2] 0.555 | [2] 0.555 |
| TBA/TTI, moles | 5/1 | 5/1 | 5/1 |
| Purge time at 3 liters per minute, seconds per 50 milliliters of toluene used | 60 | 60 | 60 |
| Temperature, °C | −18.5 | −18.5 | −18.5 |
| Time, hours | 21 | 21 | 21 |

[1] 5.0 millimoles.
[2] 1.0 millimole.

Ten grams of butadiene was charged in each run. Other ingredients were used in the proportions given in the foregoing recipes.

The results of the several runs were as follows:

*Table II*

| Run No. | Recipe | Promoter Type | Promoter Parts | Percent[2] | Conversion, percent | Inherent Viscosity | Gel, percent |
|---|---|---|---|---|---|---|---|
| 1[1] | A | anthracene | 2 | 0.5 | 97 | 2.76 | 0 |
| 2[1] | A | do | 5 | 1.2 | 84 | 3.03 | 0 |
| 3[1] | A | do | 10 | 2.3 | 90 | 3.53 | 0 |
| 4 | B | naphthalene | 2 | 0.5 | 66 | 2.66 | 0 |
| 5 | B | do | 5 | 1.2 | 66 | 2.55 | 0 |
| 6 | B | do | 10 | 2.3 | 65 | 2.50 | 0 |
| 7 | C | phenanthrene | 2 | 0.5 | 68 | 2.67 | 0 |
| 8 | C | do | 5 | 1.2 | 73 | 2.93 | 0 |
| 9 | C | do | 10 | 2.3 | 68 | 2.80 | 0 |
| 10 | control | | 0 | 0 | 58 | 2.58 | 0 |

[1] The bottle contents were purple with the intensity of the color varying directly with the amount of anthracene present. The color disappeared when the toluene solution of phenyl-beta-naphthylamine and isopropyl alcohol was added.
[2] Weight percent based on the diluent, toluene.

Examples from run numbers 3, 6, 9, and 10 were examined for determination of unsaturation and configuration by infrared analysis. The results which appear in Table III below show that the polybutadiene formed contained predominately cis 1,4 configuration.

*Table III*

| Run No. | Unsaturation, percent | Trans Content, percent | Vinyl Content, percent |
|---|---|---|---|
| 3 | 96.8 | 3 | 3.5 |
| 6 | 97.1 | <2.5 | 3.5 |
| 9 | 97.8 | <2.5 | 3.5 |
| 10 | 94.4 | <2.5 | 3.5 |

Anthracene remains in the polymer after coagulation. The amount charged was deducted from the polymer weight and the value for the percent conversion adjusted. The values given in the table have been corrected.

As shown by the above example, improved conversion at a low polymerization temperature is possible when employing the promoters according to our invention. The nature of the polymer formed as shown by inherent viscosity, percent gel formation and configuration is not significantly altered. While all runs were continued for the same length of time before stopping the reaction, it was apparent that the polymerization in runs 1–3 containing anthracene was essentially complete in about 10 hours.

As will be evident to those skilled in the art, various modifications of this invention can be made, or followed, in the light of the foregoing disclosure and discussion, without departing from the spirit or scope thereof.

We claim:
1. A method for polymerizing a monomeric material comprising a conjugated diene containing from 4 to 8, inclusive, carbon atoms to normally solid polymer which comprises contacting said monomeric material with a catalyst system comprising (a) a halide of a group IV metal containing from 2 to 4, inclusive, halogen atoms and (b) an organo metal having the formula $MR_n$ where M is a metal selected from the group consisting of aluminum, gallium, indium, thallium and beryllium; each R is selected from the group consisting of saturated acyclic hydrocarbon radicals, saturated cyclic hydrocarbon radicals, and aromatic hydrocarbon radicals; and $n$ is an integer equaling the valence of M, at a temperature in the range of −100 degrees to 100 degrees C. in the presence of an inert diluent which is liquid under the reaction conditions and a promoting amount of a polynuclear aromatic hydrocarbon having the general formula selected from the group consisting of:

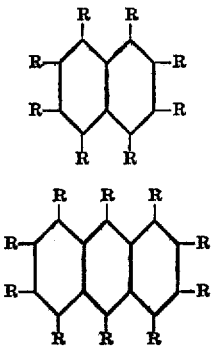

and

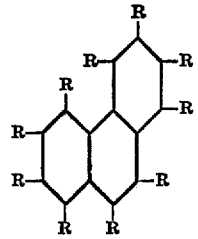

where each R is selected from the group consisting of hydrogen, alkyl, aryl, alkaryl, aralkyl, and cycloalkyl, the sum of the carbon atoms in the molecule not to exceed 26 carbon atoms.

2. A method for polymerizing a monomeric material comprising a conjugated diene containing from 4 to 8, inclusive, carbon atoms to normally solid polymer which comprises contacting said monomeric material with a catalyst system comprising (a) a halide of a group IV metal containing from 2 to 4, inclusive, halogen atoms and (b) an organo metal having the formula $MR_n$ where M is a metal selected from the group consisting of aluminum, gallium, indium, thallium and beryllium; each R is selected from the group consisting of saturated acyclic hydrocarbon radicals, saturated cyclic hydrocarbon radicals, and aromatic hydrocarbon radicals; and $n$ is an integer equaling the valence of M, at a temperature in the range of −100 degrees to 100 degrees C. in the presence of an inert diluent which is liquid under the reaction conditions and a promoting amount of a polynuclear aromatic hydrocarbon containing from 2 to 3, inclusive, unsubstituted fused aromatic rings.

3. A method according to claim 2 wherein said polynuclear aromatic hydrocarbon is naphthalene.

4. A method according to claim 2 wherein said polynuclear aromatic hydrocarbon is anthracene.

5. A method according to claim 2 wherein said polynuclear aromatic hydrocarbon is phenanthrene.

6. A method according to claim 2 wherein said polynuclear aromatic hydrocarbon is phenanthrene.

7. A method for polymerizing a monomeric material comprising a conjugated diene containing from 4 to 8, inclusive, carbon atoms to normally solid polymer which comprises contacting said monomeric material with a catalyst system comprising (a) a halide of a group IV metal containing from 2 to 4, inclusive, halogen atoms and (b) an organo metal having the formula $MR_n$ where M is a metal selected from the group consisting of aluminum, gallium, indium, thallium and beryllium; each R is selected from the group consisting of saturated acyclic hydrocarbon radicals, saturated cyclic hydrocarbon radicals, and aromatic hydrocarbon radicals; and $n$ is an integer equaling the valence of M, at a temperature in the range of −100 degrees to 100 degrees C. in the presence of sufficient inert diluent to provide a liquid reaction phase at the polymerizing conditions of temperature and pressure and from 0.05 to 10 weight percent based on the diluent of a polynuclear aromatic hydrocarbon having the general formula selected from the group consisting of:

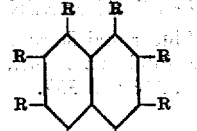

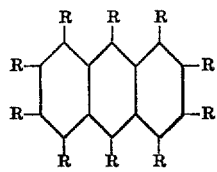

and

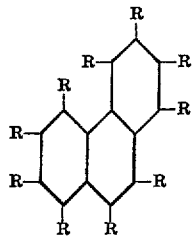

where each R is selected from the group consisting of hydrogen, alkyl, aryl, alkaryl, aralkyl, and cycloalkyl, the sum of the carbon atoms in the molecule not to exceed 26 carbon atoms.

8. A method for polymerizing a monomeric material comprising a conjugated diene containing from 4 to 8, inclusive, carbon atoms to normally solid polymer which comprises contacting said monomeric material with a catalyst system comprising (a) a halide of a group IV metal containing from 2 to 4, inclusive, halogen atoms and (b) an organo metal having the formula $MR_n$ where M is a metal selected from the group consisting of aluminum, gallium, indium, thallium and beryllium; each R is selected from the group consisting of saturated acyclic hydrocarbon radicals, saturated cyclic hydrocarbon radicals, and aromatic hydrocarbon radicals; and n is an integer equaling the valence of M, the ratio of said organo metal to said halide being in the range of 0.05 to 50 mols of said organo metal per mol of said halide, at a temperature in the range of —100° to 100° C. in the presence of sufficient inert hydrocarbon diluent to provide a liquid reaction phase at the polymerizing conditions of temperature and pressure and in the presence of from 0.05 to 10 weight percent based on the diluent of a polynuclear aromatic hydrocarbon having the general formula selected from the group consisting of:

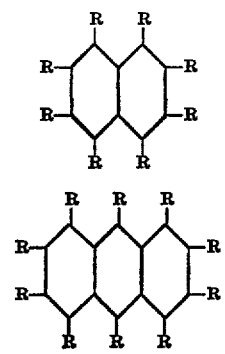

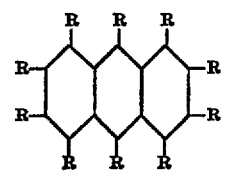

and

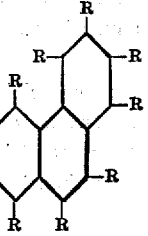

where each R is selected from the group consisting of hydrogen, alkyl, aryl, alkaryl, aralkyl, and cycloalkyl, the sum of the carbon atoms in the molecule not to exceed 26 carbon atoms.

9. A method according to claim 8 wherein said monomeric material is 1,3-butadiene.

10. A method according to claim 8 wherein said monomeric material is isoprene.

11. A method according to claim 8 wherein said catalyst system is titanium tetrachloride and triethylaluminum.

12. A method according to claim 8 wherein said catalyst system is titanium tetraiodide and triisobutylaluminum.

13. A method for polymerizing butadiene to normally solid polymer which comprises contacting said butadiene in the presence of sufficient inert hydrocarbon diluent to provide a liquid reaction phase with a catalyst consisting essentially of titanium tetraiodide and triisobutylaluminum in the presence of from 0.05 to 10 weight percent based on the diluent of a polynuclear aromatic hydrocarbon containing from 2 to 3 fused unsubstituted aromatic rings at a temperature in the range of —40° to 5° C.

14. A method for polymerizing butadiene according to claim 13 wherein said polynuclear aromatic hydrocarbon is anthracene.

15. A method for polymerizing a monomeric material comprising a conjugated diene containing from 4 to 8, inclusive, carbon atoms, to normally solid polymer which comprises contacting said monomeric material with a catalyst system comprising titanium halide and trialkylaluminum at a temperature in the range of —100° to +100° C. in the presence of an inert diluent which is liquid under the reaction conditions and a promoting amount of a polynuclear aromatic hydrocarbon having the general formula selected from the group consisting of:

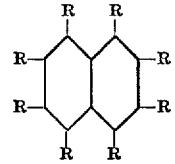

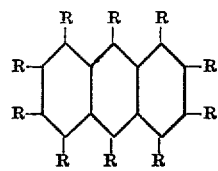

and

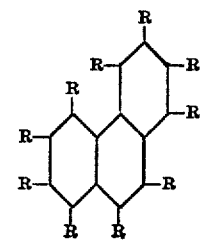

where each R is selected from the group consisting of hydrogen, alkyl, aryl, alkaryl, aralkyl, and cycloalkyl, the sum of the carbon atoms in the molecule not to exceed 26 carbon atoms.

16. A method according to claim 15 wherein said polynuclear aromatic hydrocarbon is naphthalene.

17. A method according to claim 15 wherein said polynuclear aromatic hydrocarbon is anthracene.

References Cited in the file of this patent

UNITED STATES PATENTS

| 2,492,693 | Freed | Dec. 27, 1949 |
| 2,832,759 | Nowlin et al. | Apr. 29, 1958 |
| 2,910,461 | Nowlin et al. | Oct. 27, 1959 |

OTHER REFERENCES

Gaylord et al.: Linear and Steroregular Addition Polymers, Interscience Publishers, Inc., New York, 1959, pages 101–102, 221, 336 and 337.